(12) United States Patent
Collet et al.

(10) Patent No.: US 7,903,674 B2
(45) Date of Patent: Mar. 8, 2011

(54) METHOD AND APPARATUS FOR MANAGING MULTIPLE USER SESSIONS IN AN INTERNET PROTOCOL (IP) MULTI MEDIA SYSTEM (IMS)

(75) Inventors: Jean-Luc Collet, La Gaude (FR); Francois-Xavier Drouet, La Gaude (FR); Stephane Charles Lebrun, Biot (FR); Gerard Marmigere, Drap (FR)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 11/625,423

(22) Filed: Jan. 22, 2007

(65) Prior Publication Data

US 2007/0183420 A1 Aug. 9, 2007

(30) Foreign Application Priority Data

Feb. 9, 2006 (EP) ..................................... 06300121

(51) Int. Cl.
*H04L 12/28* (2006.01)

(52) U.S. Cl. .......................................... 370/401; 709/227
(58) Field of Classification Search .................. None
See application file for complete search history.

(56) References Cited

U.S. PATENT DOCUMENTS

| 2003/0037146 A1* | 2/2003 | O'Neill | 709/226 |
| 2004/0010585 A1* | 1/2004 | Jones, Jr. et al. | 709/224 |
| 2007/0133603 A1* | 6/2007 | Weaver et al. | 370/468 |

* cited by examiner

*Primary Examiner* — Chirag G Shah
*Assistant Examiner* — Otis L Thompson, Jr.
(74) *Attorney, Agent, or Firm* — Scully, Scott, Murphy & Presser, P.C.; William H. Steinberg, Esq.

(57) ABSTRACT

A method and system of managing one or more sessions in an Internet Protocol (IP) Multi-Media service (IMS) in which a session provides a stream of data of a specific protocol in order to provide a service to a user is provided. The method in one aspect includes storing details of a session for each user in a storage media, updating the storage media if there are changes to the session and using the details of the session to optimize the bandwidth and scheduling of the service as a whole.

13 Claims, 4 Drawing Sheets

| Users IP Address / CN | List of sessions Open | Started Session (Time) | Stop Session (Time) | Services |
|---|---|---|---|---|
| | | | | |
| | | | | |

*Fig. 2*

| Process | IP address user | Services | Bandwidth Available | |
|---|---|---|---|---|
| Notification 310 | | | | |

*Fig. 3*

METHOD AND APPARATUS FOR MANAGING MULTIPLE USER SESSIONS IN AN INTERNET PROTOCOL (IP) MULTI MEDIA SYSTEM (IMS)

FIELD OF THE INVENTION

The present invention relates to a method and apparatus for managing multiple user sessions in Internet Protocol (IP) Multi-Media System (IMS) for example in a triple play environment.

BACKGROUND OF THE INVENTION

A triple play environment is one in which a plurality of services is provided to a user over an Internet Protocol (IP) transmission medium. The plurality of services provided over such a service includes, but are not limited to, TV live, Video, Video on demand (VOD), mail, games, voice over IP (VOIP), Notification, chat, video conferencing etc.

Typically, each of these types of services is transmitted using a specific and well-defined protocol, as will be understood by a person skilled in the art. Each of the services also has typical bandwidth requirements, which must be allocated and provided in the triple play environment.

A problem which exists is that there is typically a limited amount of bandwidth available to service providers to provide services to the many user connected to the service. This is a consistent and common problem for all service providers. There is also a desire to provide a service at reasonable quality of service.

In a triple play environment a number of additional problems exists. Each of the different services provided is not aware of the other services being provided at the same time. This can mean conflicts occur in determining which services should receive bandwidth and which services are more important to the user than others. The gateway at the user end (the residential gateway) can become overloaded with services requiring transmission to an appropriate end device for the user at the same time. Alternatively for quality reasons some services do not work simultaneously for certain user account With multiple services being provided over one network there can be conflicts in the different protocols used for each service (for example, HTTP, RTDP, SNMP, etc.) The quality of service (QOS) of say the TV live or VOD services can be impacted by the elements of other services, since the QOS is managed at the network level.

The session initiation Protocol (SIP) is one of the main protocols in an IMS or triple play environment and manages the creation, modification, termination, etc. of the session or services with one or more participants. SIP is text based, but has a number of failings when it comes to IMS type systems for example details of active sessions are not stored and as a result proxies cannot even determine whether a session is active or not.

The ability to customize services provided to a user and to provide multiple services which are not impacted by protocol conflicts are also desired by user and service provider alike.

Accordingly an object of the present invention is to provide a method of managing the provision of a service which overcomes at least some of the problems identified in the prior art.

SUMMARY OF THE INVENTION

A method and system for managing multiple user sessions in an Internet protocol (IP) multi media system (IMS) is provided. In one aspect, the method may include the steps of storing details of a session for each user in a storage media, updating the storage media if there are changes to the session and using the details of the session to optimize the bandwidth and scheduling of the service as a whole.

In another aspect, a system for managing one or more sessions in an Internet Protocol (IP) Multi-Media service (IMS) in which a session provides a stream of data of a protocol to provide a service to a user may include means for storing in a storage media details of a session for each user, means for updating the storage media associated with one or more changes to the session, and means for using the details of a session to optimize bandwidth and scheduling of the service.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

Reference will now be made by way of example, to the accompanying drawings, in which:

FIG. 2 is a first table for use in the present invention in one embodiment;

FIG. 3 is a second table for use in the present invention in one embodiment.

DETAILED DESCRIPTION OF THE PREFERRED EMBODIMENT

Figure 1:
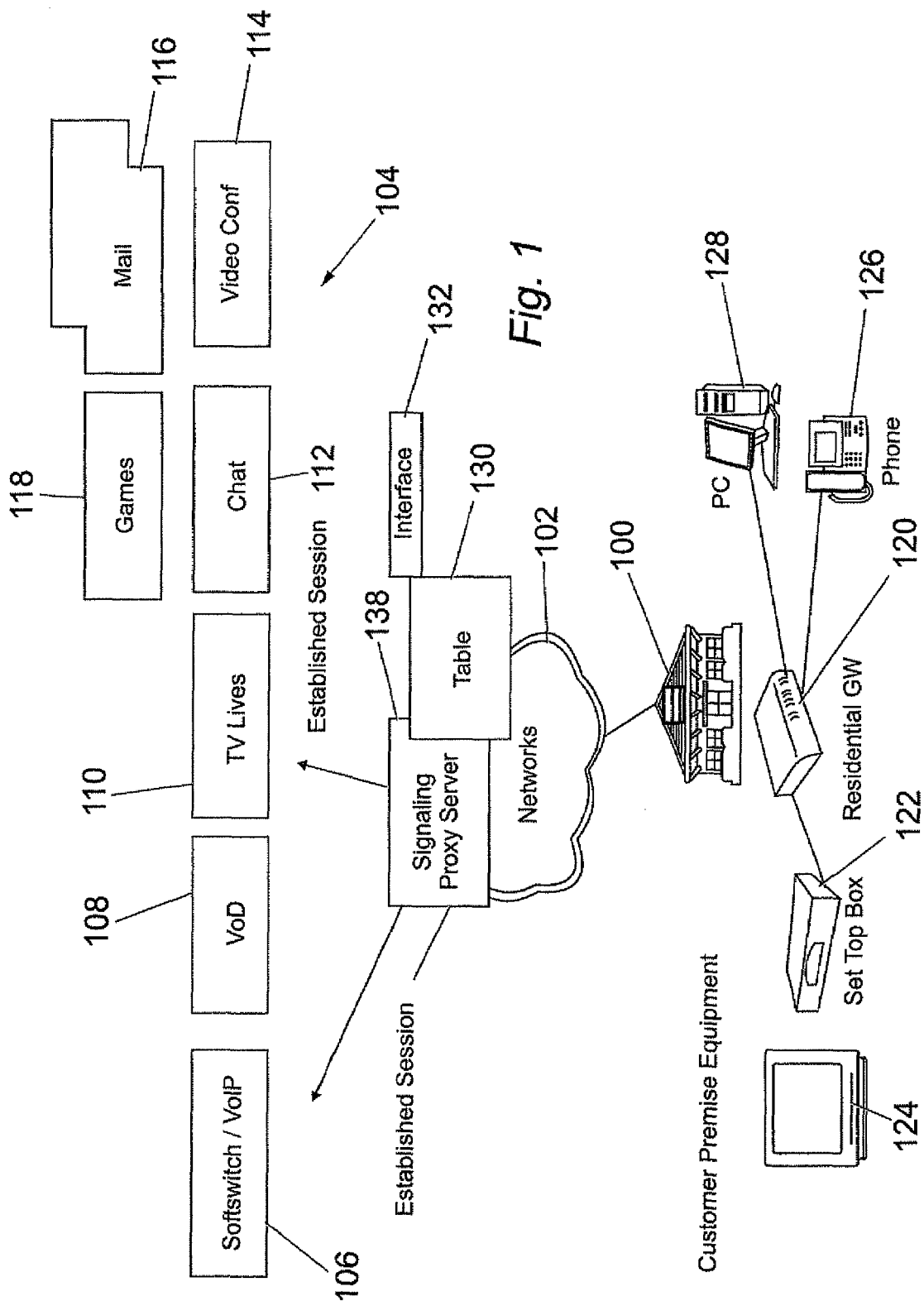
FIG. 1 is a block diagram of the system of the present invention in one embodiment.

FIG. 1 shows how a service according to the present invention in one embodiment is supplied to a user premise 100 via a network 102. The service 104 which is provided includes by way of example VOIP (106), VOD (108), TV live (110), Chat (112), Video conferencing (114), mail (116), Games (118). At the customer premises the services are received at a residential gateway 120. The services are transmitted to the relevant recipient device, For example, a set top box (STB) 122, a television 124, a telephone, 126 or a personal computer (PC) 128.

At the service provider end of the network, preferably as part of the service provider transmission equipment a signaling proxy server 128 is provided in accordance with the present invention in one embodiment.

The signaling proxy server 138 receives details of each established session for example VOIP (106) and TV live (111) as shown in FIG. 1. The server 138 stores all the session information for each established session in a table 130 along with the bandwidth used by each. The server includes an interface 132 which allows access to the table for monitoring, updating, controlling and changing the services provided to the user in a sensible manner as will be described in greater detail below.

The signaling proxy server will monitor all sessions, for example when they start, when they stop, what type of session and the relevant protocol of that session.

The interface can be used by the service provider or another third parties to gain access to details of the sessions to carry out actions. For example, if a third party wishes to establish a video conference with a user, the table will indicated whether this is possible or not. If not, the table may then be used to determine when the session which is blocking the required video conference has finished. The determination of what session block other session may be made in terms of bandwidth limits and threshold, equipment parameters or other parameters as defined by the user, service provider, third party or otherwise. The server may include a means for communicating information relating to sessions and changes therein to anyone who has made a request.

The table allows the bandwidth requirements of a user to be measured at the application and service provision level. This may give the service provider information which improves service provision or perhaps offers an alternative means of billing the user.

The QOS can be managed more effectively for the whole service provided to all users, as the total bandwidth requirements of the network are known at all times for all services.

The table enables knowledge of the protocols being used such that the risk of conflicts is mitigated. Users can utilize the service to manage the provisions of their overall service. Third parties and service providers may be able to utilize the table contents to determine how to use existing sessions for e-commerce, for example a VOD session could be used for advertising certain products or services.

A video conference could use a VOIP session with available bandwidth to accommodate it. File downloads and other administration could utilize the end of a session to commence the necessary download, or make use of bandwidth availability as appropriate.

Other examples and applications of the present invention are various as will be appreciated by those skilled in the art and are not limited just to the examples presented herein.

FIG. 2 shows an example of the form of the table 130 in FIG. 1 (the session server table). The table includes by way of example:—
  details of users including IP address, CN Common Name (Generic LDAp Name) and other user identifier 200;
  a list of sessions open for the user including details of the protocol used therefore 202;
  the time a session started 204;
  the time a session stopped 206;
  the services provided or requested 208;
  details of QOS required (not shown)
  other requirements as defined by user, service provider or third parties (not shown).

A further table, an alert table may also be used, as is shown in FIG. 3. This table may include further details such as process 300, user details 302, service details 304, bandwidth availability, requirements or thresholds 306 and other information as defined by user, service provider or third parties. An application (process) could be entered (for example request for notification 310), such that a party is informed when a certain event occurs, for example a service, on IP address is used etc. The notification may be made after recognition of the event by any appropriate means. After notification a further action or event can commence as there is now a possibility to do so, for example there is no session blocking the further action. It is possible that the content of the tables of FIGS. 2 and 3 could be combined so that only one table is used.

Figure 4:
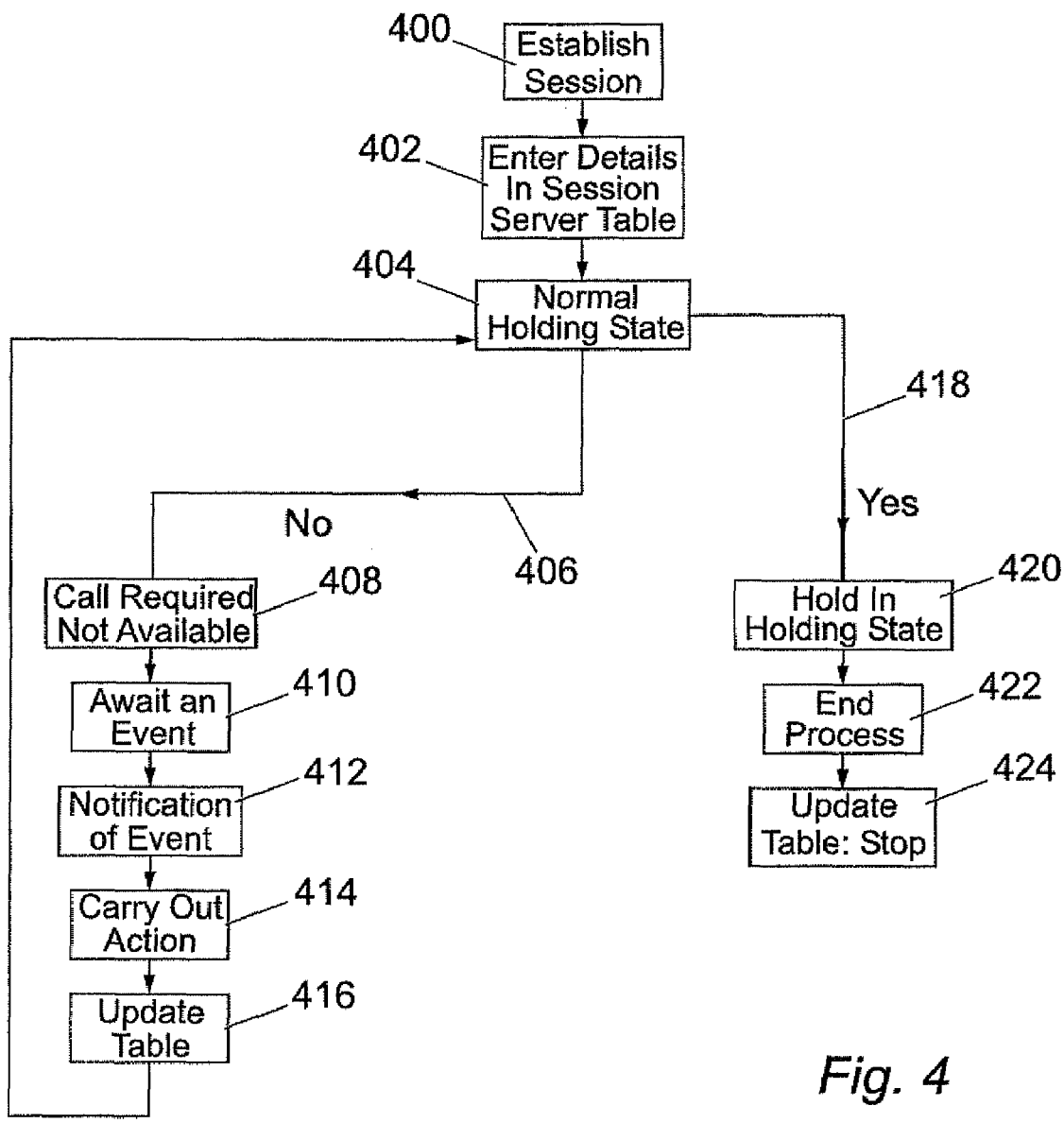
FIG. 4 is a block diagram of the method steps of the present invention in one embodiment.

The flow chart of FIG. 4 sets out details of the steps carried out in the invention by way of example. A user establishes a session (400), and details of the session are stored in the session server table (402). The details may depend on the session and the table employed as previously indicated. The session then enters a normal holding state where there are no requests for action or other processes (404). However if it is determined that the session is not in the normal holding state (NO, 406) an entry may be made in the table by the party who for example wishes to call the user in question (408), but the user is already occupied on another call The party then awaits an event (410) which will enable the call to be made. For example, in this case, the event may be that the previous call is concluded. The party may then receive a notification (412) of the change to the current sessions. The action required by the party may then be carried out (414) and the table is updated accordingly (416) and the process returns to step (404). The processes is then held in the normal holding state (420) until, the session comes to an end 422, at which point the table is updated 424 and the process is stopped.

This invention has many advantages as will be appreciated by a person of ordinary skill in the art. An example of an advantage provided by the method and apparatus of the present invention in one embodiment is that the session information is centralized and details of the sessions and bandwidth for each user are available. This means that a signaling proxy will be aware of the protocols in use at an established session (for example, SIP, RTSP, HTTP, etc.) The signaling proxy also includes an interface allowing other services to have access to the details of the sessions for a particular user. This enables new sessions to be started when an event is identified (for example, the user ends a previous session of a certain type).

The system and method of the present disclosure may be implemented and run on a general-purpose computer or computer system. The computer system may be any type of known or will be known systems. While the invention has been particularly shown and described with reference to a preferred embodiment, it will be understood that various changes in form and detail may be made therein without departing from the spirit, and scope of the invention.

We claim:

1. A method of managing one or more sessions in an Internet Protocol (IF) Multi-Media service (IMS) in which a session provides a stream of data of a protocol to provide a service to a user, the method comprising:
  storing in a storage media a user identification, a list of a plurality of sessions associated with the user identification, and a protocol associated with each session on the list;
  updating, using a computer: the list in response to one or more changes to one or more of the sessions on the list;
  providing an interface to one or more third party services to access the storage media and identify bandwidth availability and session information, wherein the one or more third party services uses information stored on the storage media to determine whether a session of a certain type can be started, and wherein bandwidth requirements of a user can be measured at a service provision level;
  using the list to optimize bandwidth and scheduling of the service, wherein the optimizing and the scheduling includes identifying a specific session, among a plurality of sessions that belong to a plurality of different users, which blocks a delivery of new data, and identifying a bandwidth requirement, a service provider and a user of the specific blocking session and making a change on the specific blocking session;
  analyzing a session on the list in order to determine if the new data can be delivered to the user either in an existing session or a new session; and
  delivering the new data to the user in the new session or the existing session if the new data can be delivered;
  wherein if the new data cannot be delivered to the user by virtue of a blocking event:
    scheduling, by a third party, a request to send the new data when the blocking event has finished;
    identifying that the blocking event has finished;
    notifying the third party that the blocking event has finished; and
    sending, by the third party, the new data in the existing session or the new session.

2. The method of claim 1, further comprising determining the appropriate session for the deliver of the new data based on a session protocol and bandwidth characteristics for the service of the user.

3. The method of claim 1, further comprising:
measuring actual bandwidth requirements of all sessions being delivered to the user at a given time; and
if a threshold is surpassed, notifying the user that bandwidth cuts should be made.

4. The method of claim 1, further comprising:
associating the session information, the session information including at least one of: an IP address, common name, start time, stop time, quality of service (QOS), bandwidth availability, bandwidth requirement, and bandwidth threshold, with each session on the list; and
storing the list and the associated session information in a table located in a server associated with providing the service to the user.

5. A system for managing one or more sessions in an Internet Protocol (IP) Multi-Media service (IMS) in which a session provides a stream of data of a protocol to provide a service to a user, comprising:
means for storing in a storage media a user identification, a list of a plurality of sessions associated with the user identification, and a protocol associated with each session on the list;
means for updating the list in response to one or more changes to one or more of the sessions on the list;
an interface for providing one or more third party services with an access to the storage media and for identifying bandwidth availability and session information, wherein the one or more third party services uses information stored on the storage media to determine whether a session of a certain type can be started, and wherein bandwidth requirements of a user can be measured at a service provision level;
means for using the list to optimize bandwidth and scheduling of the service, wherein the optimizing and the scheduling includes identifying a specific session, among a plurality of sessions that belong to a plurality of different users, which blocks a delivery of new data, and identifying a bandwidth requirement, a service provider and a user of the specific blocking session and making a change on the specific blocking session;
means for analyzing a session on the list in order to determine if the new data can be delivered to the user either in an existing session or a new session; and
means for delivering the new data to the user in the new session or the existing session if the new data can be delivered;
wherein if the new data cannot be delivered to the user by virtue of a blocking event:
scheduling, by a third party, a request to send the new data when the blocking event has finished;
identifying that the blocking event has finished;
notifying the third party that the blocking event has finished; and sending, by the third party, the new data in the existing session or the new session.

6. The system of claim 5, further including: means for determining the appropriate session for the delivery of the new data based on session protocol and bandwidth characteristics.

7. The system of claim 5, further comprising:
means for measuring actual bandwidth requirements of all sessions being delivered to the user at a given time; and
means for notifying the user that bandwidth cuts should be made if a threshold is surpassed.

8. A program storage device readable by machine, tangibly embodying a program of instructions executable by the machine to perform a method of managing one or more sessions in an Internet Protocol (IP) Multi-Media service (IMS) in which a session provides a stream of data of a protocol to provide a service to a user, the method comprising:
storing in a storage media a user identification, a list of one or more sessions associated with the user identification, and a protocol associated with each session on the list;
updating the list in response to one or more changes to one or more of the sessions on the list;
providing an interface to one or more third party services to access the storage media and identify bandwidth availability and session information, wherein the one or more third party services uses information stored on the storage media to determine whether a session of a certain type can be started, and wherein bandwidth requirements of a user can be measured at a service provision level;
using the list to optimize bandwidth and scheduling of the service, wherein the optimizing and the scheduling includes identifying a specific session, among a plurality of sessions that belong to a plurality of different users, which blocks a delivery of new data, and identifying a bandwidth requirement, a service provider and a user of the specific blocking session and making a change on the specific blocking sessions;
analyzing a session on the list in order to determine if the new data can be delivered to the user either in an existing session or a new session; and
delivering the new data to the user in the new session or the existing session if the new data can be delivered;
wherein if the new data cannot be delivered to the user by virtue of a blocking event:
scheduling, by a third party, a request to send the new data when the blocking event has finished;
identifying that the blocking event has finished;
notifying the third party that the blocking event has finished; and sending, by the third party, the new data in the existing session or the new session.

9. The program storage device of claim 8, further comprising: determining the appropriate session for the delivery of the new data based on session protocol and bandwidth characteristics for the service of the user.

10. The program storage device of claim 8, further comprising:
measuring actual bandwidth requirements of all sessions being delivered to the user at a given time; and
if a threshold is surpassed, notifying the user that bandwidth cuts should be made.

11. The program storage device of claim 8, further comprising:
associating the session information, the session information including at least one of: an IP address, common name, start time, stop time, quality of service (QOS), bandwidth availability, bandwidth requirement, and bandwidth threshold, with each session on the list; and
storing the list and the associated session information in a table located in a server associated with providing the service to the user.

12. The method of claim 1, wherein a session belonging to a user utilizes available bandwidth of another session that belongs to another user.

13. The method of claim 1, further comprising:
using an existing session of a first user to deliver the new data to a second user, wherein the existing session is not associated with the second user, and the first user and the second user are different.

* * * * *